Oct. 26, 1943.　　E. F. BURTON ET AL　　2,332,841
BERTH AND CHAIR ARRANGEMENT
Filed Dec. 17, 1937　　10 Sheets-Sheet 2

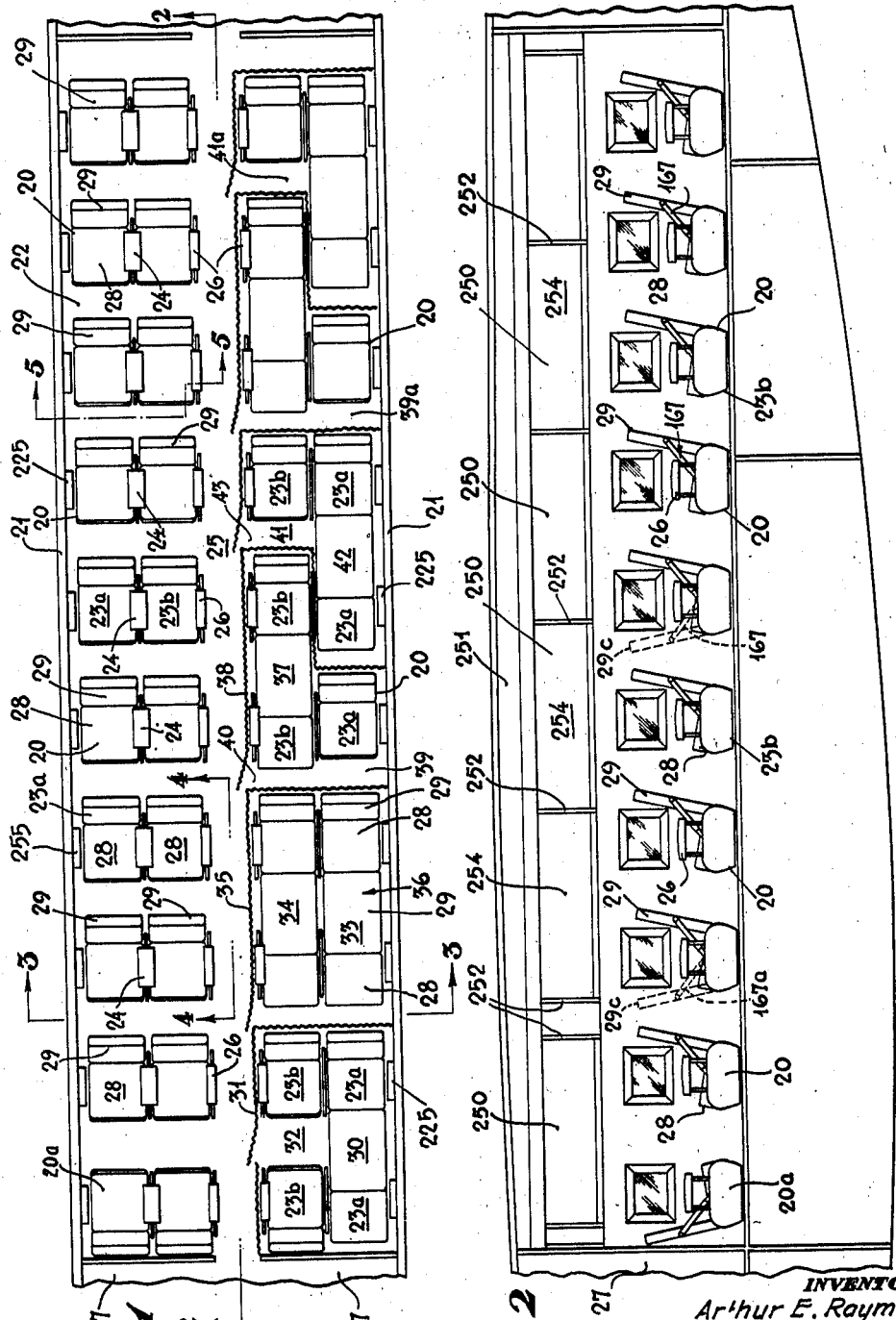

Arthur E. Raymond,
Edward F. Burton and
John C. Buckwalter
INVENTORS

BY
ATTORNEY

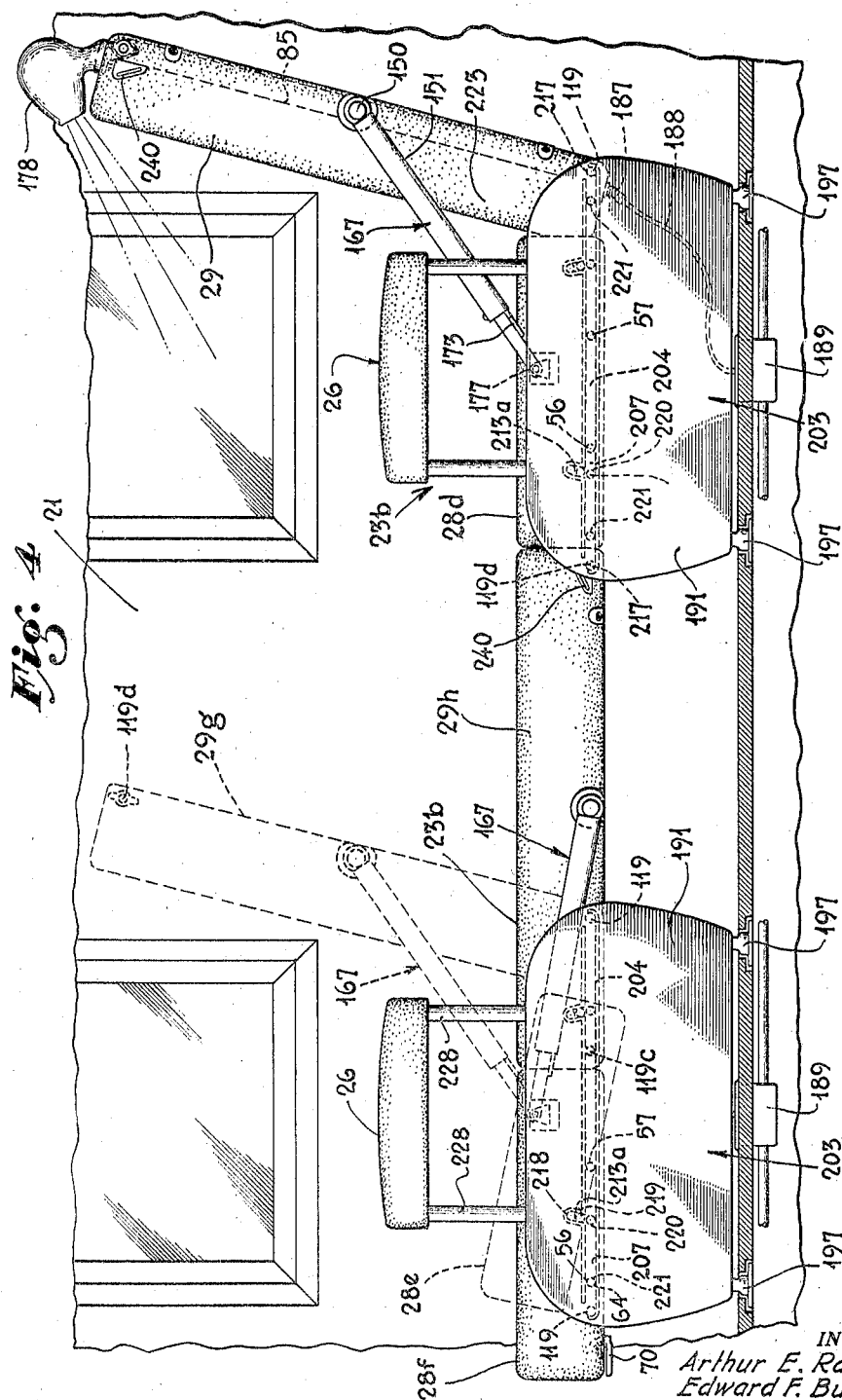

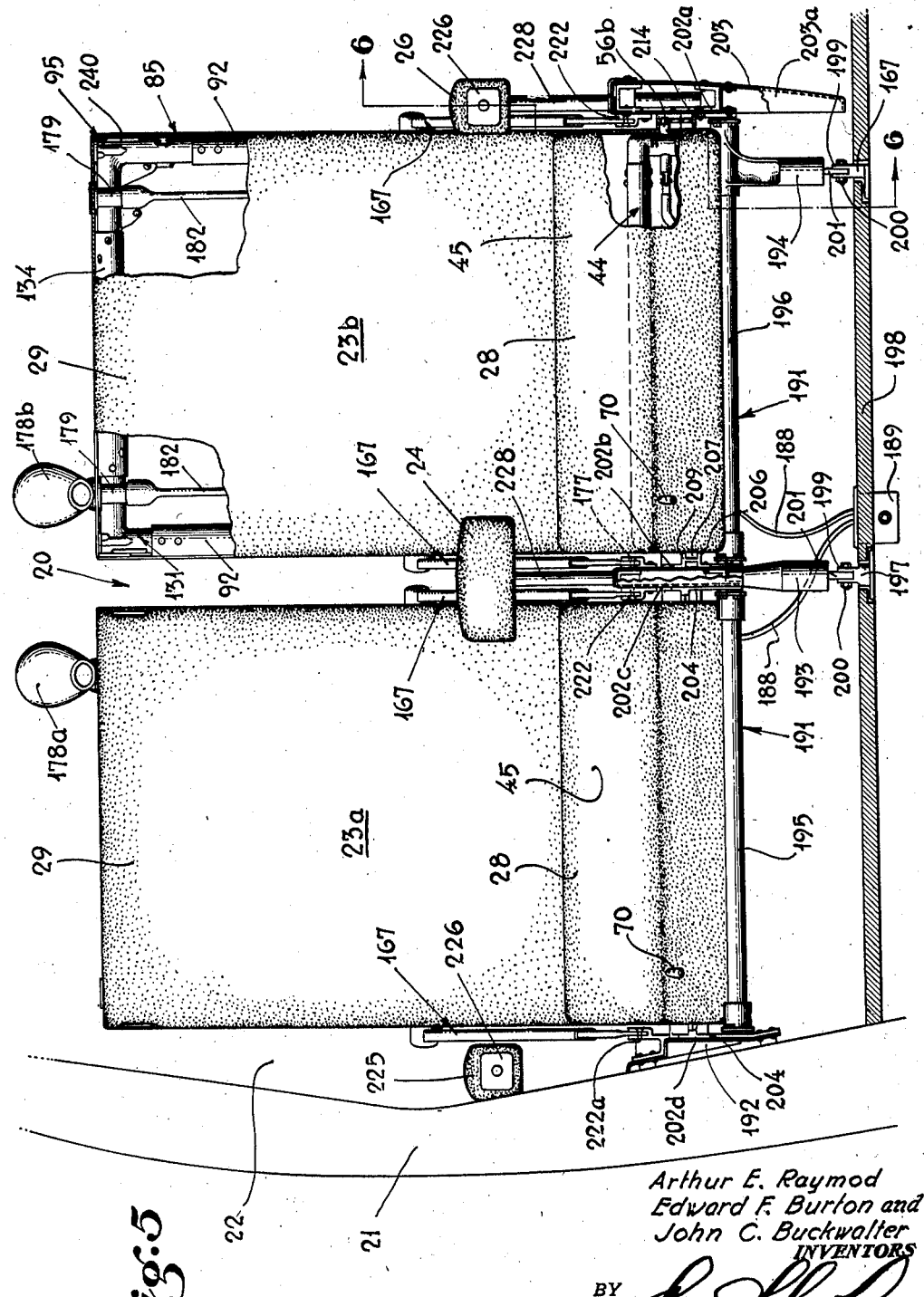

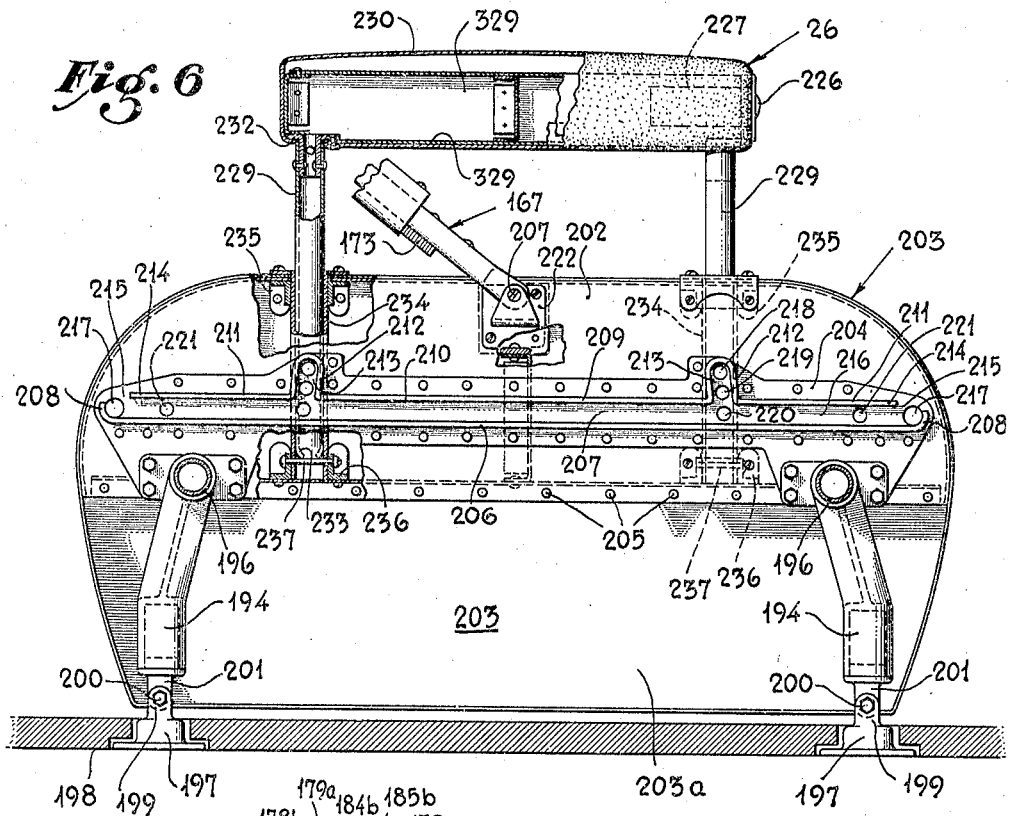
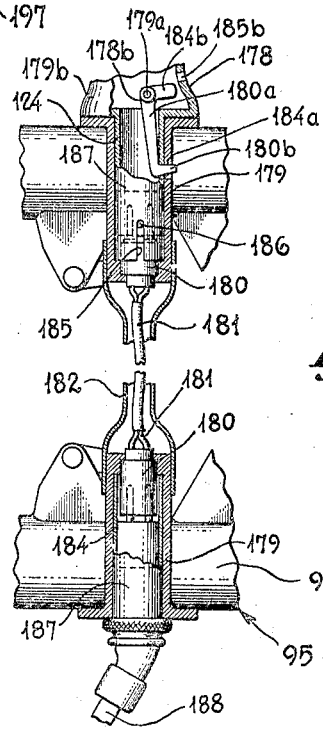

Oct. 26, 1943.  E. F. BURTON ET AL  2,332,841
BERTH AND CHAIR ARRANGEMENT
Filed Dec. 17, 1937  10 Sheets-Sheet 6
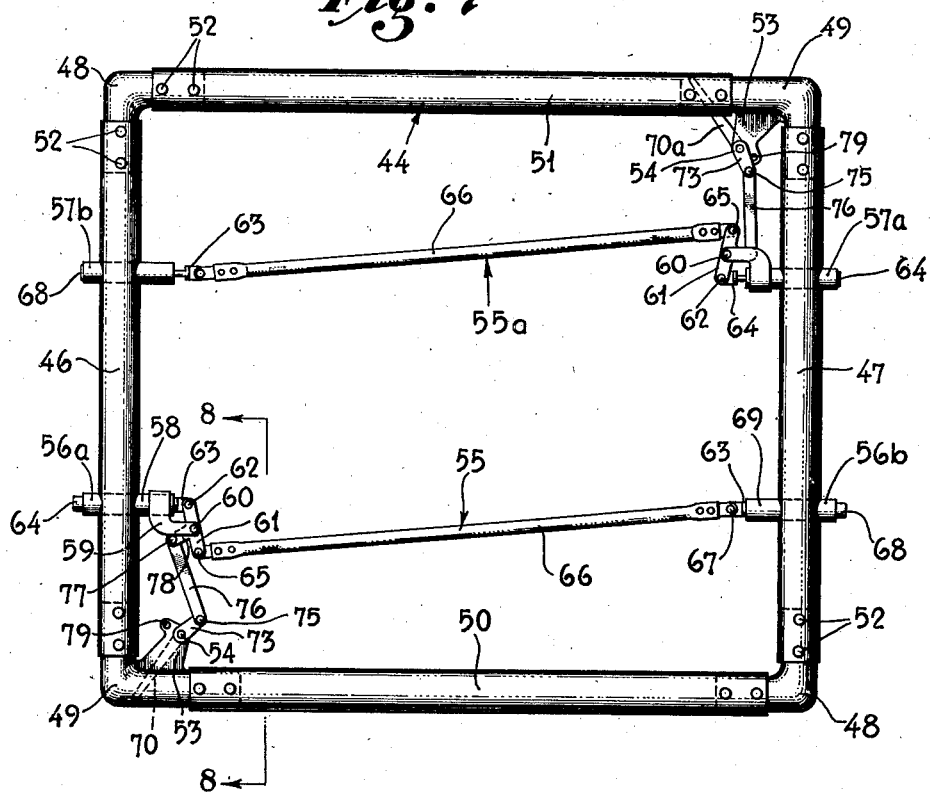
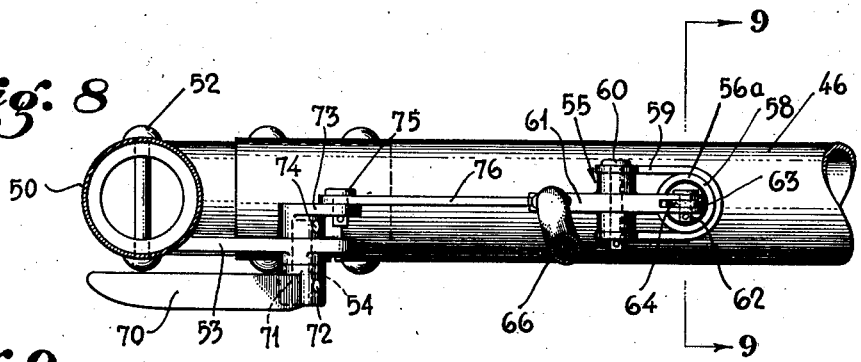
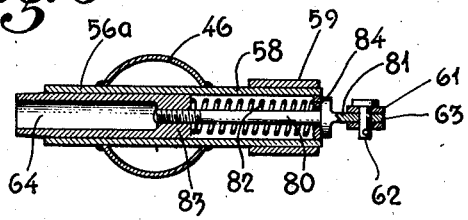
Arthur E. Raymond,
Edward F. Burton and
John C. Buckwalter
INVENTORS
BY
ATTORNEY

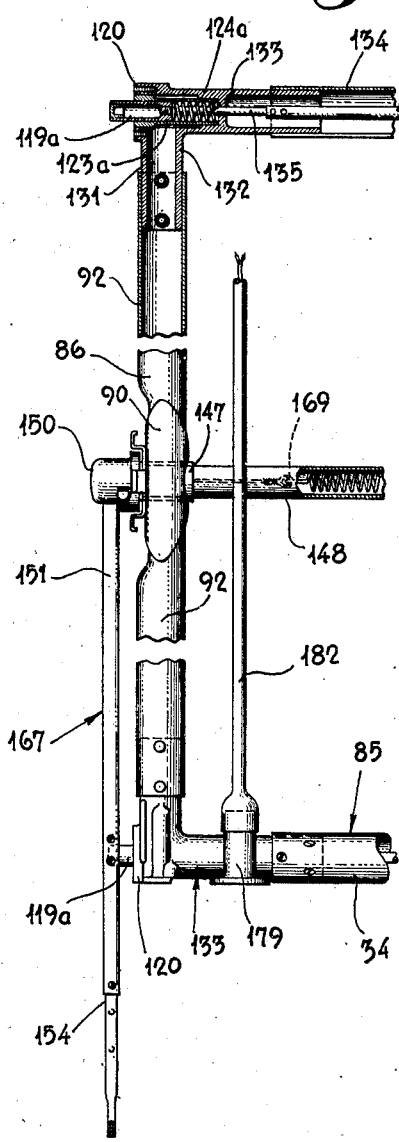
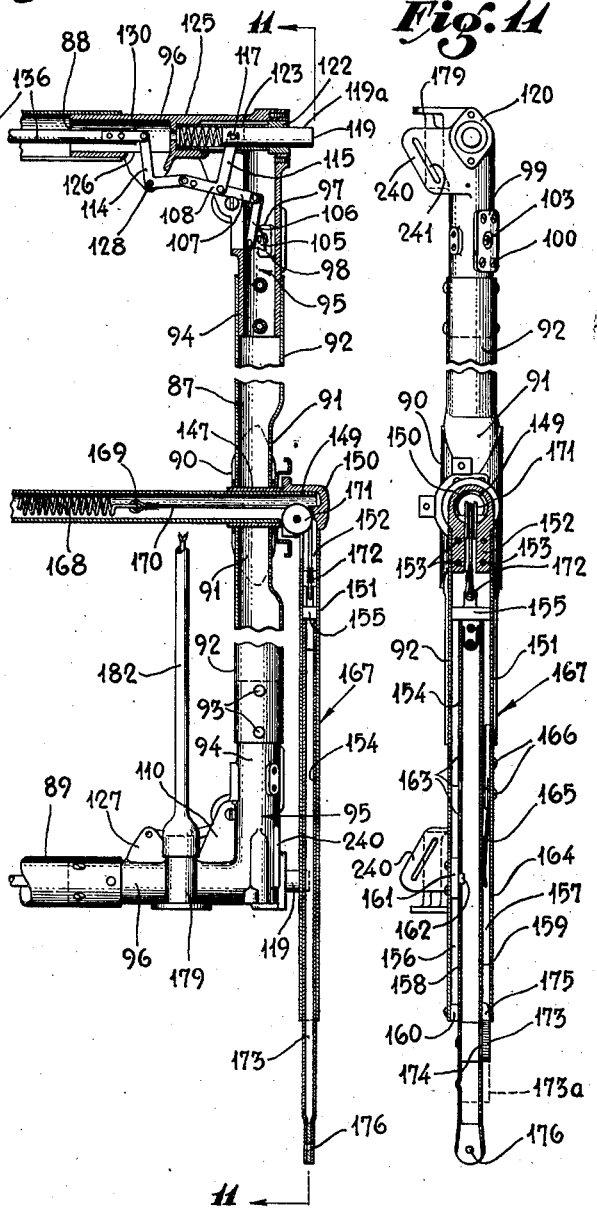

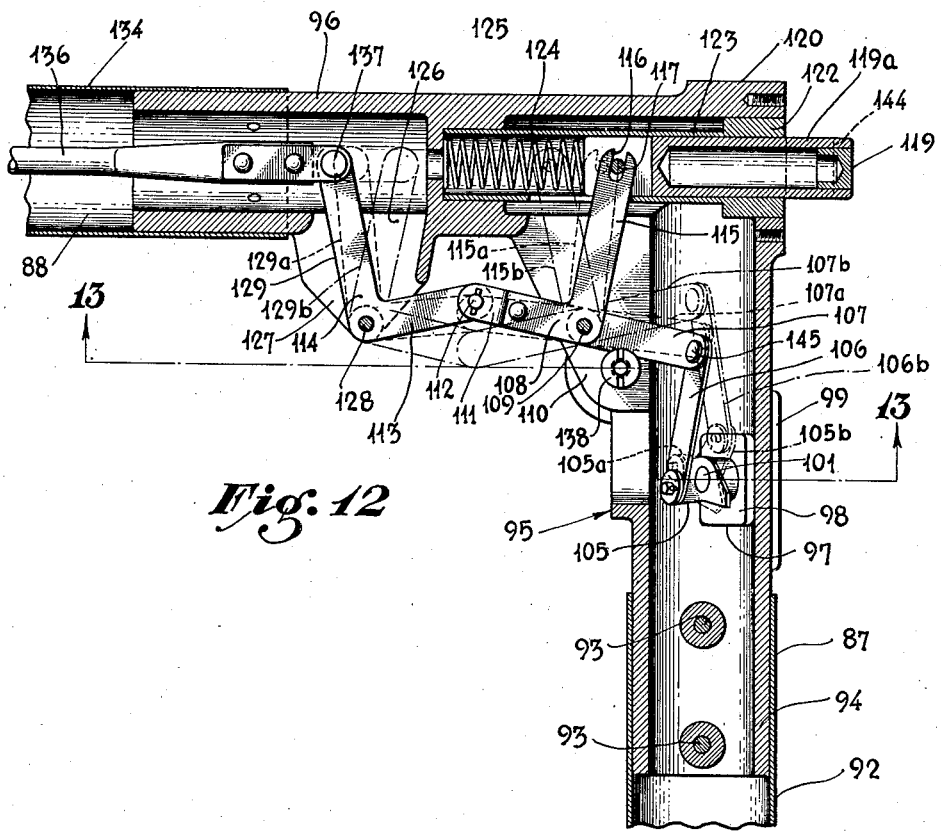

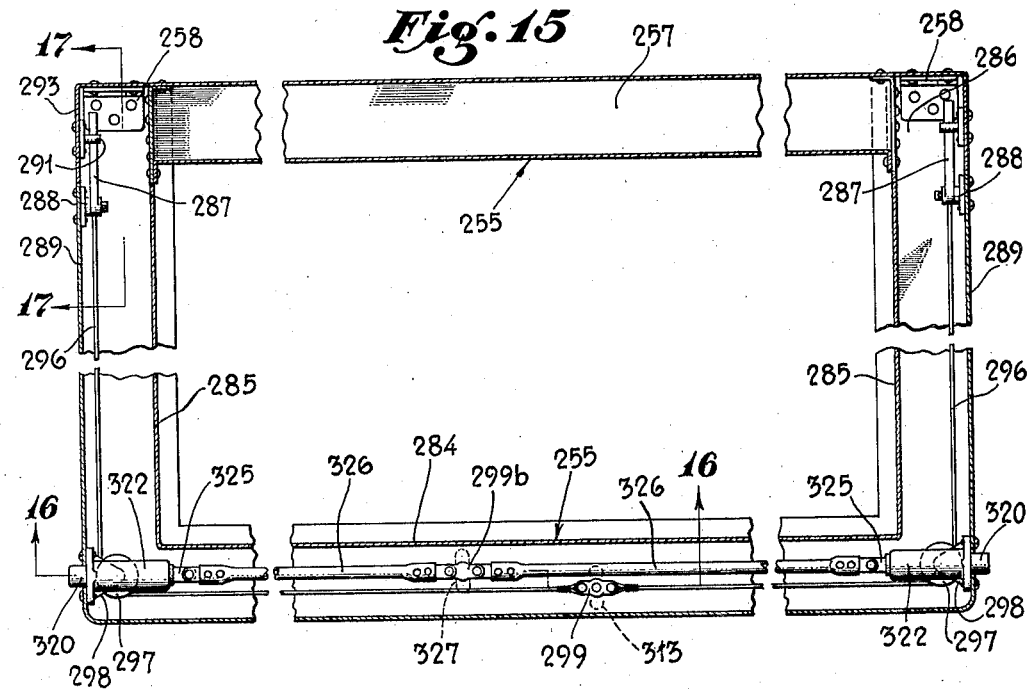
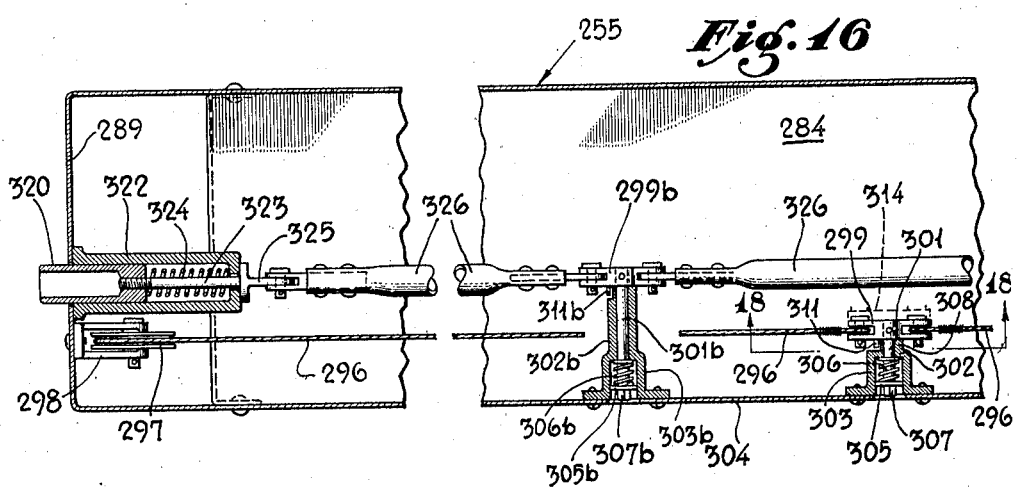
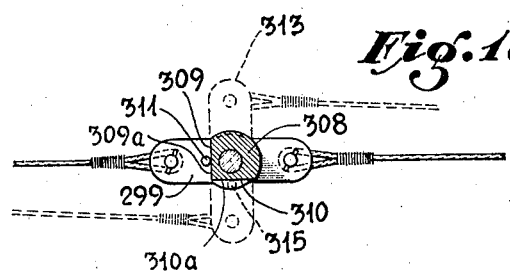

Oct. 26, 1943.   E. F. BURTON ET AL   2,332,841
BERTH AND CHAIR ARRANGEMENT
Filed Dec. 17, 1937   10 Sheets-Sheet 10
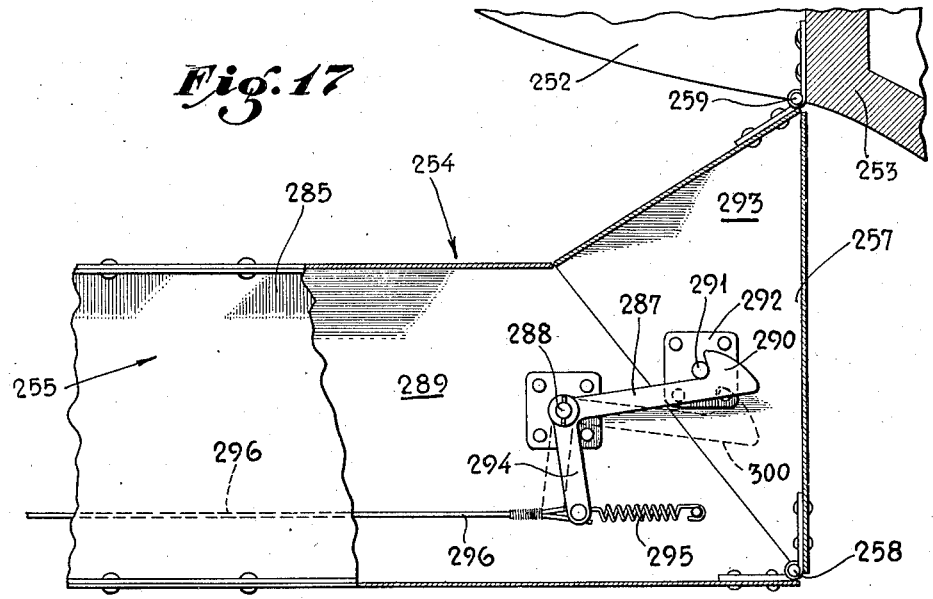
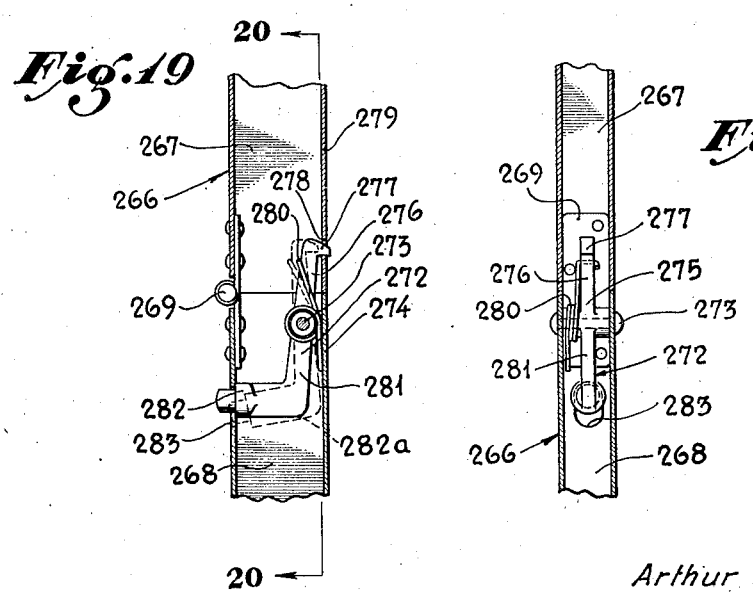
Arthur E. Raymond,
Edward F. Burton and
John C. Buckwalter
INVENTORS
BY
ATTORNEY Patented Oct. 26, 1943

2,332,841

UNITED STATES PATENT OFFICE 2,332,841

BERTH AND CHAIR ARRANGEMENT

Edward F. Burton and John C. Buckwalter, Los Angeles, Calif., assignors to Douglas Aircraft Company, Inc., Santa Monica, Calif., a corporation of Delaware Application December 17, 1937, Serial No. 180,424

18 Claims. (Cl. 244—118)

Our invention relates to passenger accommodations for aircraft, and relates in particular to a structure adapted to be readily converted from a chair to a berth.

It is an object of our present invention to provide in the cabin of an aircraft, for example, the cabin of a large airplane, rows of convertible chairs placed along the side walls of the cabin in spaced relation and without partitions therebetween, these convertible chairs being so formed that any two longitudinally consecutive chairs may be readily adjusted so as to form a berth. An advantage of our present invention is that the convertible chair members may be placed in spaced relation throughout the length of the aircraft cabin without obstructing partitions dividing the cabin into sections. Although our improvement makes it possible for any passenger to view the entire length of the cabin during day travel, that is, when the chairs are being used in their normal manner as passenger seats, the consecutive chairs are so constructed and arranged that they may be quickly converted into a single berth, or two consecutive pairs of chairs may be readily adjusted to provide a double berth. Likewise, a group of three chairs may be employed as the bed and accompanying chair or seat of a compartment, readily enclosed by curtains for privacy.

A further object of the invention is to provide a simple chair construction for use in an aircraft, which, in addition to its capacity of ready conversion to form part of a berth, has adjustments which may be used during the employment of the chair in its normal manner to contribute greatest comfort and ease to the passenger seated therein. The seat of the chair may be readily adjusted to desired slope, and the chair back is supported so that the seated passenger may readily change the slope thereof as desired. Likewise, the chair back may be swung from one end to the other of the seat, so that the chair may be used in either forwardly or rearwardly faced position.

In the preferred use of the invention double chairs are placed along each side of the aircraft cabin with a center aisle therebetween. Each of these double chairs consists of two adjacent single chairs, each with its own individually adjusted seat and back, and one individual chair being separated from the other by a center arm rest. The individual chair which is closest to the wall of the cabin is provided with a permanent side arm rest, and the individual chair adjacent the aisle has an aisle arm rest. The center and aisle arm rests are removable so that they may be removed from their normal positions during the converting of the chairs into beds. After the beds are made up the aisle arm rests may be replaced so as to form aisle guards.

A further object of the invention is to provide a novel chair back construction and adjustable supporting means therefor, such supporting means including elements for locking the chair back in a desired position of inclination and in such a manner that same may not be inadvertently unlocked. An important feature of the invention consists in the simple, adjustable link means which supports the chair back and which may be readily adjusted by the chair's occupant to give a desired slope to the seat back.

A further object of the invention is to provide a seat back having locking means at the ends thereof whereby either end of the seat back may be brought into an interlocked engagement with the seat base, depending upon whether the chair is to face forwardly or rearwardly. This locking means comprises pins or dogs with key operated means for holding them in fully retracted positions, partly extended positions or fully extended positions as may be required in the different positions and uses of the chair back.

A further object of the invention is to provide, as part of the passenger accommodation of an aircraft, an upper berth construction having a bed member, and link panel supporting this bed member so that it may be swung upwardly into a ceiling recess during day travel, at which time it will be in a position in which it will not form an obstruction in the cabin, and whch bed member may be swung into a lowered position in such manner that the inner edge thereof will not project into the aisle and decrease the shoulder room of such aisle.

A further object of the invention is to provide a chair of the character hereinbefore described having a reversible back equipped with means for supporting an individual lamp on the upper part of the chair back when such back is in either of its positions of cooperation with the chair seat, and providing simple means for supplying electric current to the lamp in either of its positions.

Further objects and advantages of the invention will be brought out in the following part of the specification.

Referring to the drawings which are for illustrative purposes only:

Fig. 1 is a plan view of a portion of an aircraft cabin equipped with chairs of our invention and showing such chairs in various adjustments to which they are adapted.

Fig. 2 is a sectional view taken substantially as indicated by the line 2—2 of Fig. 1.

Fig. 4 is an enlarged elevational view of consecutive chairs, this view being taken from the position indicated by the line 4—4 of Fig. 1, and showing a manner in which a bed or berth may be formed from the two consecutive chairs.

Fig. 5 is an enlarged sectional view taken as indicated by the line 5—5 of Fig. 1.

Fig. 6 is a further enlarged section taken substantially as indicated by the line 6—6 of Fig. 5.

Fig. 7 is an enlarged plan view of the seat frame of a chair prior to the placing of the upholstering thereon.

Fig. 8 is an enlarged fragmentary section taken as indicated by the line 8—8 of Fig. 7.

Fig. 9 is a section taken on the plane indicated by the line 9—9 of Fig. 8.

Fig. 10 is a partly sectioned view of a chair back frame and adjustable supporting links therefor.

Fig. 11 is an elevational view corresponding to Fig. 10, partly sectioned as indicated by the line 11—11 of Fig. 10.

Fig. 12 is an enlarged fragmentary section showing the upper right hand corner fitting 95 of Fig. 10.

Fig. 13 is a cross-section taken as indicated by the line 13—13 of Fig. 12.

Fig. 14 is an enlarged fragmentary sectional view showing cooperating electrical fittings which are placed at adjacent ends of the seat back frame.

Fig. 15 is an enlarged cross-section through an upper berth, taken on a plane indicated by the line 15—15 of Fig. 3, this view being contracted by the breaking out of intermediate portions thereof.

Fig. 16 is an enlarged fragmentary section taken as indicated by the line 16—16 of Fig. 15.

Fig. 17 is an enlarged fragmentary sectional view taken as indicated by the line 17—17 of Fig. 15.

Fig. 18 is an enlarged fragmentary sectional view taken as indicated by the line 18—18 of Fig. 16.

Fig. 19 is an enlarged fragmentary cross-section showing the locking means employed for the center joint of the collapsible upper berth strut.

Fig. 20 is a cross-section taken as indicated by the line 20—20 of Fig. 19.

Figure 3:
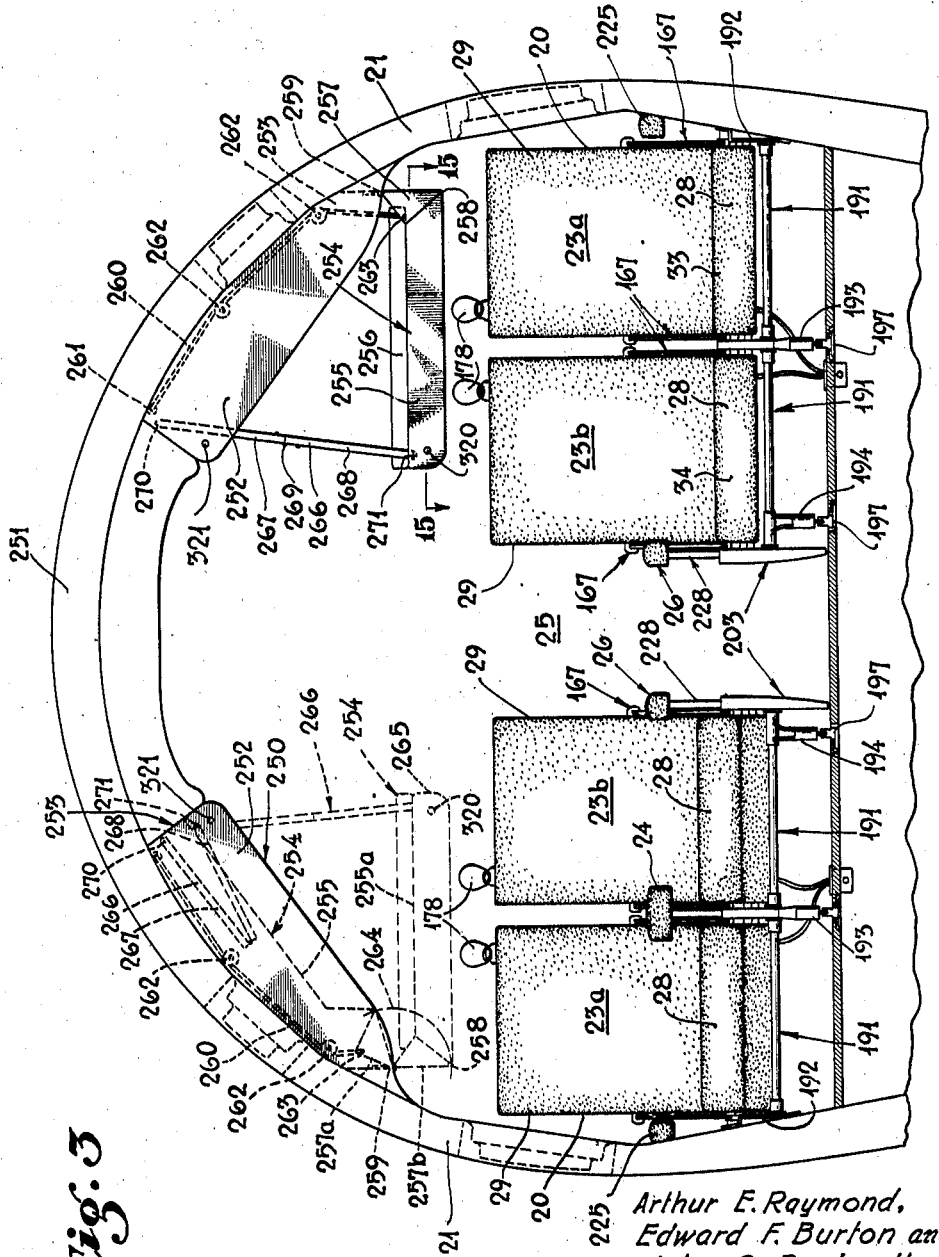
Fig. 3 is an enlarged cross section on the plane represented by the line 3—3 of Fig. 1.

In Fig. 1 we show chair units 20 spaced in consecutive order and in longitudinal direction along a side wall 21 of an aircraft cabin 22. Each of these chair units 20 comprises a double chair consisting of two single chairs 23 in side by side relation, such chairs being individually indicated as chair 23a and 23b. The chairs 23a are adjacent the side wall 21, and are each separated from a companion chair 23b by a center arm rest 24. The chairs 23b are adjacent the aisle 25 of the cabin 22 and are provided with aisle arm rests 26. The chair units 20, with the exception of the single chair unit 20a at the forward end of the cabin 22 are all shown facing toward the front end 27 of the cabin 22. That is to say, the seats 28 of the chairs 23 are faced toward the end 27 of the cabin 22, and the backs 29 of the chairs 23 are shown disposed toward the aft of the cabin 22.

Any longitudinally consecutive pair of chairs 23 may be adjusted to form a bed or berth. For example, in the lower part of Fig. 1 the first and second wall chairs 23a are shown adjusted so as to form a berth 30 whereas the aisle seats 23b adjacent thereto are left in their normal condition. When enclosed by a curtain 31, the berth 30 and the adjacent chairs 23b form a compartment 32. If desired, two consecutive chair units 20 may be adjusted to form two adjacent berths such as shown at 33 and 34, such adjacent berths 33 and 34 constituting a double bed which may be enclosed by a curtain 35, thereby forming a double bed compartment 36.

Three chairs 23 may be employed to form a compartment comprising a single berth and one chair. For example, the aisle chairs 23b of sections 5 and 6 may be adjusted to form a berth 37 and a curtain 38 may be extended along the aisle 25, around the end of the berth 37 and across the back of the chair 23a of sections 5, forming a compartment 39 having its entrance at 40. To form a compartment 41, complementary to the compartment 39, chairs 23a of sections 6 and 7 may be made up to form a berth 42. The chair of this compartment 41 will be the aisle 23b of section 7, and the compartment 41 will have an entrance 43. The three double chair units 20 of sections 8, 9, and 10, consisting of six single chairs 23, may be made up to form compartments 39a and 41a which are counterparts of the compartments 39 and 41.

The seat 28 of each chair 23 includes a rectangular seat frame 44 such as shown in detail in Figs. 7, 8, and 9. These frames 44 are entirely enclosed and concealed by the cushion coverings 45 of the seats 28. As shown in Fig. 7, the frame 44 includes a pair of side bars 46 and 47 which are made from light weight tubes of metal such as duralumin. By means of corner fittings 48 and 49, the ends of the side bars 46 and 47 are connected to the ends of front and rear tubular members 50 and 51. It will be noted that the corner fittings 48 are diagonally disposed and consist of simple, tubular elbows, the legs of which project into the ends of the associated members 46, 47, 50, and 51 and are secured in place by means of rivets 52.

The corner fittings 49 are likewise diagonally disposed and comprise tubular elbows having plates or webs 53 projecting inwardly from the lower portion thereof to serve as supports for vertical hinge pins or shafts 54 of duplicate locking mechanisms 55 and 55a. The locking mechanism 55 comprises tubular trunnions 56 and 57, individually identified as 56a, 56b, 57a, and 57b, which project outwardly from the side bars 46 and 47. Trunnion 56a is formed by the outer end of a tube 58 extending horizontally through a side bar 46 or 47. On the inner end of the tube 58 a clevis 59 is secured, this clevis 59 supporting a vertical pin 60 on which a double bell crank 61 is pivoted. The forward end of the double bell crank 61 is connected by means of a pin 62 to the inner end 63 of a locking pin 64 which is slidable within the tube 58. The rearward end of the double bell crank 61 is connected by means of a pivot 65 to a link 66 which has its opposite end connected by means of a pivot 67 to the inner end of a locking pin 68 which is slidable within the horizontal tube 69 secured in such position that the outer end thereof will form the tubular trunnion 56b.

It will be noted that when the double bell crank 61 is rotated in clockwise direction both locking pins 64 will be retracted, and that when the member 61 is rotated in anticlockwise direction, the members 64 will be projected into locking position. This movement of the member 61 is accomplished by means of a lever 70 which is secured to the lower end 71 of the shaft 54 by means of a cotter 72 as shown in Fig. 8. The shaft 54 projects vertically through the plate 53 and a lever 73 is secured to the upper end thereof by use of a cotter 74. A pivot pin 75, carried by the outer end of the lever 73, is connected by means of a link 76 to a pivot 77 carried by the lateral arm 78 of the double bell crank 61. To retract the pins 64 of the locking device 55, the lever 70 is swung in anticlockwise direction from the position in which it is shown in dotted lines in Fig. 7, transmitting anticlockwise rotation in the lever 73 to carry it to engagement with a stop pin 79 supported by the horizontal wall 53. The motion transmitted through the link 76 rotates the member 61 in clockwise direction with the result that the pins 64 are simultaneously retracted.

The parts of the locking device 55a are duplicates of those parts described relative to the locking device 55, but the cooperating parts of the device 55a are disposed in reverse order, and the trunnions corresponding to trunnions 56a and 56b are identified by the numerals 57a and 57b for convenience in later describing the adjustment of a seat 28, which includes the frame 44, in conjunction with the seat base or supporting structure 191. The operating lever 70 of the locking device 55a is shown in a position 70a to hold the locking pins 64 of the device 55a in retracted position, the lever 73 of the device 55a being at this time in engagement with the cooperating stop pin 79.

Fig. 9 shows the manner in which the trunnions and locking pins of the two preceding paragraphs are formed. In this Fig. 9 the tube 58 is shown projecting horizontally through the side member 46 so that the outer end thereof will project so as to form the trunnion 56 specifically designated as trunnion 56a. The locking pin 64 is of hollow construction for the purpose of preserving lightness therein, and includes a rearwardly extending stem 80 which projects through the inner portion of the tube 58 and has a pivot connection 81 formed on the inner end thereof. The locking pin 64 is normally urged in outward direction by means of a compression spring 82 which surrounds the stem 80 in such position that one end thereof will engage the inner end 83 of the pin 64 and the other end thereof will engage an annular wall 84 secured in the inner end of the tube 58.

As shown in dotted lines in Fig. 4, each chair back 29 includes a back frame 85, details of which are shown in Figs. 10 to 14 inclusive. This back frame 85 is of rectangular form and comprises side members 86 and 87 and end members 88 and 89. The side member 87 includes a central fitting 90 which is of oval cross-section to receive the deformed ends 91 of tubes 92 which extend upwardly and downwardly therefrom. The outer end of each tube 92 is connected by means of rivets 93 to a leg 94 of a corner fitting 95 which is of hollow construction and has a laterally extending leg portion 96. The upper and lower corner fittings 95 are made in opposite-hand relation so that the upper and lower right hand corners of the frame 85 will be symmetrical. Accordingly, the following parts described with relation to the upper corner fitting 95 will be common to the lower corner fitting 95 but will exist therein in opposite-hand relation.

The wall of the leg 94 of the corner fitting 95 has an opening 97 in which a body or support 98 is secured. This support 98 has an external plate or flange 99 which rests against the exterior of the leg 94, and through which screws 100 are extended into threaded engagement with the leg 94 to secure the body 97 in place. A short shaft 101 projects through an opening 102 in the body 98, this shaft 101 having a squared outer end 103 lying in a counterbore 104 which faces outwardly. The squared end 103 of the shaft 101, being thus submerged in the counterbore 104, can be engaged and rotated only by use of a key. A lever or crank 105 is fixed on the inner end of the shaft 101 and is connected by means of a link 106 with one arm 107 of a T-lever 108 carried on a pivot pin 109 which is supported by plates 110 integrally formed in the corner of the fitting 95. The remaining arm 111 of the T-lever 108 is connected by means of a pivot 112 with the lower arm 113 of a bell crank 114. The stem 115 of the T-lever 108 projects upwardly and has a notch 116 in the end thereof adapted to engage a pin 117 carried at the inner end of a tubular locking pin 119 which is identified as pin 119a and which normally projects from the corner fitting 95 in the manner shown in Fig. 11, but which may be partly retracted or fully retracted as will be hereinafter described.

As further shown in Fig. 12, the corner of the fitting 95 comprises a boss 120 having an opening formed on the axis of the end member 88 to support the outer end 122 of a cylindrical shell 123 which carries the locking pin 119 and a compression spring 124 which yieldably urges the locking pin 119 outwardly. The lateral leg 96 of the fitting 95 has a cylindrical wall 125 which is bored so as to support the inner end of the shell 123. Lying inwardly, or to the left of the wall 125, the leg 96 has an inwardly faced opening 126 and inwardly projecting walls 127 at the edge of the opening 126, these walls 127 carrying a pivot member 128 on which the bell crank 114 is supported in such position that the arm 129 thereof will project through the opening 126 into the interior of the hollow inner or left end 130 of the leg 96.

The side member 86 of the frame 85 includes a central fitting 90, placed in opposite-hand relation to the fitting 90 of the side member 87, and receiving the inner end of upwardly and downwardly projecting tubes 92, the outer ends of which tubes 92 receive the vertical legs 131 of corner fittings 132 which are in the form of elbows having lateral legs 133 which cooperate in the forming of the end members 88 and 89 of the frame 85 and are connected to the legs 96 of the corner fittings 95 by lateral tubes 134. The corner fittings 132 have laterally faced bosses 120, bored to receive cylindrical sleeves or shells 123a in which locking pins 119, identified as pins 119b, are slidably disposed. A stem 135 projects inwardly from the inner end of each locking pin 119, and a spring 124a is placed around the stem 135 in position to urge the locking pin 119b outwardly. From each stem 135 an extension 136 extends through the tube 134 into the inner end portion 130 of the cooperating leg 96, to be connected by means of a pivot 137 with the arm 129 of the bell crank 114. The locking mechanism for the upper end of the frame 85, which locking mechanism includes the pins 119a and 119b and the movable parts associated therewith, is duplicated at the lower end of the frame 85, the interior parts of the lower locking mechanism being disposed in the lower corner fittings 95 and 132 and the lower tube 134, the lower corner fittings 95 and 133 being opposite-hand counterparts of the upper corner fittings 95 and 133. Each corner fitting 95 and 135 has a forwardly projecting web 240, with a diagonal slot 241 therein, to provide means for attachment of the ends of a safety belt, not shown.

Owing to the manner in which the T-lever 108 and the bell crank 114 are connected, the stem 115 and the arm 129 of the members 108 and 114 will swing in opposite directions when motion is transmitted through the link 106 from the crank 105. In Fig. 12, the parts 105, 106, 108, and 114 are shown by full lines in the positions thereof wherein the springs 124 and 124a are permitted to force the locking pins 119a and 119b into fully extended position. At this time the arm 107 of the T-lever 108 rests under the head 138 of an adjustable stop pin 139 which projects, as shown in Fig. 13, through an opening 140 in the wall 110 and has a plate 141 secured on the outer end thereof in position to slide in a recess 142, there being a compression spring 143 in the recess 142 to urge the stop pin 139 in a direction to carry the head 138 thereof toward the wall 110.

To move the locking pins 119 into partly retracted, or intermediate position as indicated by dotted lines 144, Fig. 12, a key is applied to the square ends 103 of the shaft 101, to rotate the crank 105 into the position indicated by dotted lines 105b, thereby moving the arm 107 upwardly into the dotted line position 107b thereof, at which time the spring 143 will move the stop pin 139 so as to carry the head 138 thereof toward the wall 110 and into such position that the periphery thereof will be in a position to engage the lower edge of the arm 107 and prevent downward movement thereof when rotative force is released from the shaft 101. Accordingly, the head 138 of the stop pin 139 serves continuously as a stop in the path of movement of the arm 101, except when the stop pin 139 is moved inwardly to carry the head 138 thereof into the position in which it is shown in Fig. 13, such movement of the stop pin 139 being accomplished by manual pressure against the plate 141 on the outer end of the pin 139.

From the intermediate positions thereof indicated by dotted lines 115a and 129a, the lever 115 and the arm 129 of the bell crank 114 may be swung toward each other into position to fully retract the locking pins 119 by rotating the lever 105 into the position thereof indicated by broken lines 105b. This will move the arm 107, the lever or stem 115, and the arm 129 into the positions thereof respectively indicated by broken lines 107b, 115b, and 129b. The crank 105 will have been, at this time, swung slightly past a line extended through the axis of the shaft 101 and the axis of the pivot pin 145 which connects the upper end of the link 106 with the arm 107, and the locking pins 119 will be retained in fully retraced position until the crank 105 is manually rotated in anticlockwise direction from the position in which it is shown in broken lines 105b. The downward force against the link 106, exerted by the springs 124 and 124a when the link is in the position thereof indicated by broken lines 106b, will tend to rotate the lever 105 in clockwise direction, but clockwise rotation of the crank 105 beyond the position thereof shown by broken lines 105b, will be prevented by an adjustable stop screw 146, shown in Fig. 13.

The center fittings 90 of the side members 86 and 87 of the frame 85, Fig. 10, carry aligned sleeves 147 through which a lateral tube 148 projects. On each projecting end 149 of the tube 148 a cap 150 is secured, each of these caps 150 carrying a laterally projecting arm 151 comprised of a tube of flattened form, there being a boss 152 on each of the caps 150, as shown in Fig. 11, to which the upper end of the tube 151 may be secured as by rivets 153. A link or bar 154, of tubular form, is slidably disposed in each of the tubular arms 151. Each tubular bar 154 has a head 155 thereon of a size to slide in the tubular arm 151. As shown in Fig. 10, the tubular bar 154 has a minor cross-sectional dimension substantially corresponding to the width of the tubular arm 151, but as shown in Fig. 11, the major cross-sectional dimension of the tubular bar 154 is less than the major cross-sectional dimension of the tubular arm 151 so that spaces 156 and 157 exist adjacent the top wall 158 and the bottom wall 159 of the tubular bar 154 within the arm 151. A small filler block 160 is secured to the lower end of the tubular arm 151 in a position to close the lower end of the space 156, and above the filler block 160 a block 161 is secured within the tubular arm 151, this block 161 having a projecting locking pin or lug 162 adapted to engage one of a plurality of openings 163 in the top space 158 of the tubular bar 154, such engagement preventing longitudinal movement of the bar 154 in the arm 151.

To yieldably hold the lower wall 164 of the tubular arm 151 away from the lower face 159 of the bar 154, a leaf spring 165 is provided. The spring 165 is secured in the upper part of space 157 by means of screws 166, and yieldably urges the bar 154 toward the block 161 so as to maintain the locking pin 162 in a selected opening 163. Each arm 151 with its contained bar 154 constitutes an extensible and adjustable seat back adjusting link 167, and to yieldably resist extension thereof a spring 168 is placed in the lateral tube 148. The ends 169 of the spring 168 are connected to cables 170 which extend over sheaves 171 mounted within the caps 150 so as to lie in the outer ends 149 of the lateral tube 148. The outer ends 172 of the cables 170 are connected to the heads 155 at the inner ends of the tubular bars 154. A locking member 173, Fig. 11, is slidably held in an opening 174 in the lower part of the tubular bar 154 so that it may be moved from a position, such as shown in full lines, wherein the upper end 175 thereof lies within the lower end of the space 157, to retracted or non-locking position such as shown by dotted lines 173a, wherein the upper end 175 will be removed from the space 157. The outer extremity of the bar 154 is flattened and provided with an opening 176 for connection of the bar 154 to a pivot 177 carried by a chair base as indicated in Fig. 4.

In Fig. 4 an electric spot lamp 178 is shown in operative position at the upper end of a seat back 29. For support of this lamp 178, and also for the connection of the lamp to an electric current, means are provided as disclosed in Figs. 10, 11, and 14. As shown in the lower part of Fig. 10, each leg 96 and 133 has a socket 179 integrally formed thereon, thereby providing a pair of lamp supports at each upper and lower end of a seat structure. As shown in Fig. 14, an electrical connector 180 is secured in the bottom of each socket 179, and upper and lower connectors 180 are connected electrically by wires 181 which extend through tubes 182 from lower sockets 179 to upper sockets 179. The lamp 178 is provided with a plug or extension adapted to fit into any socket 179, such plug 183 having an outer tubular wall 184 provided with a slot 185 for engagement with a pin 186 held in cooperative position in the wall of the socket 179. To secure the lamp 178 against unauthorized removal, a latch 178a is provided, this latch comprising a body 178b which is carried on a pivot 179a in the base 179b of the lamp. From this body 178b a latch lever 180a projects downwardly within the tubular wall 184 and has a dog 180b which projects through the wall 184 so as to engage an opening 184a in the side wall of the socket 179. An actuating lever 184b extends laterally from the body 178b, in a position to be engaged by a key, not shown, which may be inserted through an opening 185b in the wall of the lamp base 179b and by downward pressure against the lever 184b cause release of the latch dog 180b. When a lamp 178 is connected to an upper socket 179, as shown in Figs. 4 and 14, the plug 187 of a lamp cord 188 is inserted in the lower socket 179 of the seat back associated with the upper sockets 179 supporting the lamp 178. As shown in Fig. 4, the lamp cord 188 extends from an outlet box 189 and carries electric current to a connector 180 in a lower socket 179 and then through electric wires 181, Fig. 14, to an upper connector 180 which is connected to the lamp 178. Since the sockets 179 are all the same, a lamp 178 may be placed in two positions at the top of a seat back, in both fore and aft positions of such seat back; that is to say, when the seat backs are disposed at the rightward ends of the seat 28, Fig. 2, so that the chairs will be facing forwardly, the lamp 178 will be connected to a socket 179 at one end of the seat back, and will be connected to a socket at the opposite end of the seat back 29 when the same is reversed as shown by dotted lines 190 in Fig. 2 to face the chair toward the aft of the cabin.

Each chair unit 20, as best shown in Figs. 3 and 5, has a base or supporting structure 191 comprising a wall bracket 192, intermediate legs 193 and aisle legs 194. Tubes 195 connect the center legs 193 to the wall brackets 192 and tubes 196 connect the center legs 193 to the aisle legs 194. As shown also in Fig. 6, floor plates 197 are provided for supporting the legs 193 and 194, these floor plates being mounted in the cabin floor 198 in submerged relation and having upwardly projecting wings 199 disposed in spaced relation so as to support lateral bolts 200. The legs 194 have tongues 201 which project downwardly between the members 199 and are connected thereto by the bolt 200. In vertical planes disposed beyond the ends of the horizontal tubes 195 and 196 there are plates 202 individually identified as 202a, 202b, 202c, and 202d. As shown in Fig. 5, the plate 202a forms the inner wall of the end member 203 of the seat supporting structure 191, this wall 202a being connected to an outer plate 203a having the outline shown in Figs. 4 and 6. The plates 202b and 202c, Fig. 5, project in side by side relation upwardly from the upper ends of the center legs 193. The plate 202d forms part of the wall bracket 192 which is suitably secured to the side wall 21 of the cabin 22.

The seats 28, as shown in Fig. 5, are placed between the vertical planes defined by the plates 202, and mounted on these plates 202, so as to face toward the sides of the seat 28, there are guide plates 204 which are secured to the vertical plates 202 by means of rivets 205, as shown in Fig. 6. Each guide plate has a horizontal channel 207 formed in a position to face the edge of the adjacent seat 28 by a lower horizontal rib 206 having upturned ends 208, and a horizontal upper rib 209 having a central portion 210 and horizontal end portions 211 which are parallel to the lower rib 206. The center and end portions 210 and 211 of the upper rib 209 are connected by horse-shoe shaped rib portions 212 forming spaced upwardly faced pockets 213 communicating with and forming part of the channel 207. The ends of the rib 209 are foreshortened with respect to the upturned ends 208 of the rib 206, as indicated at 214, so as to produce upwardly faced entranceways 215 at the ends of the channel 207.

At the ends of the channel 207, and in the bottom wall 216 thereof, there are openings 217 of such diameter as to receive locking pins 119 carried by a back frame 85. At the upper end of each pocket 213 there is an opening 218 of such diameter as to receive a locking pin 64 of a seat frame 44. Below each opening 218 in a pocket 213 there is a similar opening 219, and below each opening 219 there is a pin receiving opening 220 which is positioned in the bottom wall 216 of the channel 207. In the bottom wall 216 of the channel 207 there are two more pin receiving openings 221, one each of which is placed near an end of the channel 207.

When a seat 28 is supported in position between adjacent vertical plates 202 of the seat supporting structure 191, the trunnions 56 and 57 of its contained seat frame 44 will project into the channel 207. Depending upon the position of the seat 28, selected locking pins 64 are projected into selected ones of the openings 218, 219, 220, or 221. For example, the seat indicated by numeral 28d in Fig. 4 is disposed in horizontal position so as to be used in cooperation with a back 29 to form a chair. At this time the locking pins 64 associated with the forward or front trunnions 56 of the seat frame 44 associated with the seat 28d are projected into openings 220 in the bottom walls of channels 207, which opening 220 lies below the front pockets 213 specifically identified as 213a. The remaining trunnions 57 of the seat frame 44 rest in intermediate portions of channels 207. Should it be desired to raise the left or forward portion of a seat 28, so as to place the same in a position indicated by dotted lines 28e of Fig. 4, the trunnions 56 may be lifted into the leftwardly disposed pockets 213a and the locking pins 64 associated with the trunnions 56 may be projected into openings 219 or 218, depending upon the height to which it is desired to lift the left end of the seat indicated at 28e.

As shown in each of Figs. 4 and 5, the plates 202a, 202b, and 202c have clevis fittings 222 supported on the upper parts thereof, and the wall fitting 192 has a clevis fitting 222a at the upper part thereof, which clevis fitting supports the pivot pins 177, Fig. 4, by which the outer ends of the bars 154 of the seat supporting and adjusting links 167 are connected to the seat supporting structure 191. When a chair is adjusted so as to face front, or left, as shown in the right-hand portion of Fig. 4, the links 167 extend upwardly and rightwardly from the pivots 177 to the central portion of the associated back 29, and locking pins 199 at the lower end of the back frame 85, associated with the back 29, are extended into openings 217 at the rearward or right ends of channels 207, the lower end of the back 29 being thus pivotally supported by the lower locking pins 119. At this time the lower part of the cushion 223 of the back 29 will be in engagement with the rightward end of the seat specifically indicated at 28d. To change the slope of the back 29, the length of the links 167 is changed. With the locking block 173 in retracted position as shown in full lines in Fig. 4 or as shown in dotted lines 173a in Fig. 11, this change in length of the links 167 is accomplished merely by lifting on the lower portion of the tubular arm 151 so as to change the angular relation of the parts 151 and 164. With reference to Fig. 11, it will be perceived that the lifting force applied to the lower ends of the tubular members 151 will swing the lower wall 164 towards the bottom wall 159 of the bar 164, and will, at the same time, move the block 161 to the left and away from the top wall 158 of the bar 164 so as to carry the locking pin 162 out of the opening 163 with which it is engaged. The outer tubular member or arm 151 may be then moved relative to the tubular bar 154 and by release of the lifting force exerted against the lower portion of the tubular arm 151, the pin 162 may be caused to engage another selected opening 163 so as to lock the bar 154 in a new position of extension relative to the tubular arm 151. When it is desired to adjust a chair to a position wherein it will face aft, the lower locking pins 119 shown in the right-hand portion of Fig. 4 will be retracted in the manner described relative to Figs. 10 to 13 inclusive and the seat back 29 will be rotated in anticlockwise direction on the axis defined by the pivot 77 and also on the axis defined by the crossing tube 148, to the ends 149 of which the caps 150 are connected, so that when the links 167 reach positions such as indicated by dotted lines 167a in Fig. 2, the seat back 185 will have rotated through an angle a little greater than 180° and the cushion of such seat member, when it is in reverse position indicated by dotted lines 29c in Fig. 2, will face aft. The locking pins 119 which were previously at the top of the back 29, as shown in Fig. 4, will now be in position to engage openings 217 at the left end of channels 207. Of course, the seat 28d must at this time be moved to the right in the channel 207 to allow space at the left end thereof for the back cushion 223.

The space between longitudinally consecutive chairs 23 is less than the length of the seat back 29; and when it is desired to make a bed out of two longitudinally consecutive chairs, the procedure illustrated in Fig. 4 is to be followed. The seat 28 of one chair, for example, the seat specifically indicated at 28f, will be moved in its associated supporting channels 207 to such position that the locking pins 64, associated with one set of trunnions 56 or 57, may be caused to engage openings 221. For example, locking pins 64 are shown in engagement with openings 221 near the left ends of the channel 207. The lower locking pins 119 of the seat back indicated in dotted line position 22g will be partly retracted, or, in other words, will be retracted to the intermediate position indicated by dotted lines in Fig. 12, so that these projecting pins 119 will serve as trunnions which will slide leftwardly in the channels 207 of the left seat support of Fig. 4 to a position such as indicated at 119c, at which time the seat back may be swung down from the dotted line position 29g to the full line position 29h. The upper locking pin 119 of the seat back will then drop into the leftward ends of the channels 207 of the seat supporting structure shown at the right-hand side of Fig. 4, as indicated by dotted lines 119d. The seat 28f, the back 29h, and the seat 28d now form a bed. In the construction shown, the seat back 29 is swingable downwardly to horizontal position on the supporting links 167 therefor, and the seat 28 may be shifted forwardly from its normal position to provide room for the front end of the now horizontal back 29 when the rear end of such horizontal back 29 supported by the seat supporting structure 191 of the consecutive chairs. Since any seat 28 is shiftable in either forwardly or rearwardly direction in its supporting channels 207, and any seat back may be swung from fore facing position to aft facing position, as previously described, consecutive chairs 23 may be made up into berths facing either fore or aft of the cabin 22.

The center arm rest 24 and the aisle arm rest 26 are detachable, so that they can be temporarily removed from the positions in which they are shown, during the adjusting of longitudinally consecutive chairs 23 to form berths and during the swinging of chair backs from front facing position to aft facing position. The arm rests 225 disposed along the cabin walls adjacent the chairs 23a are permanently secured in the position shown, and the ends of these arm rests 225, and also the ends of the aisle arm rests 26 are provided with ash receivers 226 which are normally held in retracted position in compartments 227 provided therefor in the arms 225 and 26, as indicated in Fig. 6.

For support of the arm rests 24 and 26, tubular legs 228 are provided, the lower ends of these tubular legs being extended into suitable pockets or vertical openings in the seat supporting structure 191. Illustrative of this, we have shown in Fig. 6 an arm rest 26 formed of hollow construction from sheet metal 329 and having a suitable cushion or upholstering 230 thereon. A pair of legs 229 are secured to the arm 26 in downwardly projecting relation, and may be secured thereto by use of fittings such as indicated at 232. Each leg 229 has a rounded lower end 233 so that it may be readily guided into the upper end of a vertical tube 234. A pair of such tubes 234 are shown supported in an end member 203 of a seat supporting structure 191. These tubes 234 provide receptacles to receive the lower ends of the tubular legs 229, and may be secured in the positions shown in Fig. 6 by fittings 235 and 236. To serve as stops for the downward movement of the legs 229 cross bolts 237 may be passed through the lower ends of the vertical tubes 234. When it is desired to remove the arm rest 26, it is merely lifted so that the lower portions of its legs 229 will be withdrawn from the tubes 234.

As shown in Figs. 2 and 3, upper berth sections 250 are disposed along the side walls 21 of the cabin 22, in positions above the chair units 20, where such side walls curve inwardly to meet the ceiling 251 of the cabin. Partitions 252 define shallow recesses 253 in which the upper berths 254 are contained, as shown in dotted lines in Fig. 3, when such berths are not made up. As shown in Fig. 3, each berth 254 includes a lightweight metal frame 255 for supporting a mattress 256, and a link member, or panel, 257 connected by hinges 258 to the outer edge of the frame 255, such link member extending full length of the frame 255 and forming the outer portion of such frame 255. This link panel 257 is connected by hinges 259 to the wall structure of the compartment 253. Resilient members 260, which may be rubber shock cords, are connected to fittings 261 in the upper part of the recesses 253, and are extended over pulleys 262 to connection with the link members 257 at 263. The resilient members 260 exert yieldable force tending to hold the members 257 in the position thereof indicated by dotted lines 257a in Fig. 3. When the berth frame 255 is lowered from its concealed position within the compartment 253 to position for use, as indicated by dotted line 255a, the link panel associated therewith swings on hinge 259 from the dotted line position 257a to the depending position shown by dotted lines 257b. Accordingly, the outer edge of the frame 255 is swung downwardly and outwardly through an arc 264, thereby bringing the frame into dotted line position 255a wherein the inner edge 265 thereof will be spaced from the aisle 25.

When in the lowered position, the frame 255 has its inner edge supported by collapsible struts 266 consisting of upper and lower links 267 and 268 which are connected by a hinge 269, the upper link 267 being connected to a pivot 270 within the recess 253 and the lower end of the lower link 268 being connected to a pivot carried by the berth frame 255. Locking means 272, as shown in Figs. 19 and 20, are provided for holding the joints between the upper and lower links 267 and 268 rigid when the collapsible strut 266 is in extended position as shown in full line 3. The links 267 and 268 are formed from metal tubes of rectangular, or round, cross-section, and in an end of one of these tubes, for example, in the upper end of link 268, a transverse hinge pin 273 is secured. This hinge pin 273 is placed in transverse position adjacent the wall 274, which is opposite the hinge 269, and a latching member 275 is swung thereon. The latch member 275 includes an upwardly extending lever 276 having a dog 277 adapted to engage an opening 278 in the wall 279 of the upper link member 267, there being a spring 280 to urge the lever 276 in outward direction. The latch member 275 also includes an arm 281 which extends downwardly and then bends leftwardly to provide an engageable portion 282 which will project through an opening 283 in the wall of the lower link 268 below the hinge 269. When it is desired to release the latch member 275 pressure is applied to the engagement portion 282 to swing the same inwardly and downwardly into a position indicated by dotted lines 282a.

As shown in Fig. 15, the berth frame 255 comprises an inner side frame member 284 and end frame members 285 extending from the ends thereof. The frame members 284 and 285 are fabricated from light-weight metal and are of hollow construction. The link member 257 consists of a light-weight fabricated beam having the same length as the side member 284, and being secured to the outer ends 286 of the end members 285 by the hinges 258.

Locking means are provided for holding the berth frame 255 and the link member 257 in the relative positions shown in full lines in Fig. 3, so that there can be no movement of the link member 257 relative to the frame 255 when the berth is in the lowered position. Such locking means is shown to large scale in Figs. 15 and 17 and comprises a pair of latch levers 287 pivoted on pivot members 288 which are secured to walls 289 of the end frame member 285. The levers 287 have hooks 290 on the ends thereof adapted to engage pins 291 which project from plates 292 secured to the end wall 293 of the link member 257. Operating levers 294 project downwardly from the inner ends of the levers 287, as shown in Fig. 17, and springs 295 are connected thereto to urge the latch levers into locking position. From the lever 294 cables 296 are extended within the end frame member 285 to pulleys 297 which are held in the ends of the side frame member 284 by brackets 298.

From the pulleys 297 the cables 296 are extended within the side frame member 284 to a centrally pivoted lever 299 which, upon being rotated, exerts a pull on each of the cables 296, such pull being transmitted to the actuating levers 294 associated with the latch levers 287 to move the same into the retracted position indicated by dotted lines 300 in Fig. 17.

As shown in Figs. 16 and 18, the centrally pivoted lever 299 is fixed on the inner end of the shaft 301 which projects through the bottom wall 302 of a cup fitting 303 mounted in the bottom wall 304 of the side frame member 284. The shaft 301 has a flange 305 near its lower end against which a spring 306 exerts a downward pressure. A squared body 307, for engagement of a key, projects downwardly from the flange 305. A boss 308 projects upwardly from the bottom wall 302 of the cup 303, this boss having flat side faces 309 and 310 disposed at right angles to each other. A lug or pin 311 projects downwardly from the lever 299 in a position to lie adjacent the flattened face 309, when the lever 299 is in the position in which it is shown in full line in Figs. 15, 16, and 18. In order to rotate the lever 299 from its full line position to the position thereof indicated by dotted lines 313 it is necessary to force upwardly on the shaft 301 against the force of the spring 306 to move the lever 299 into the position thereof shown by dotted lines 314 in Fig. 16, which will raise the lug 311 into a position above the upper face of the boss 308. Then, if the lever 299 is rotated in anti-clockwise direction, Fig. 18, into the position thereof indicated by dotted lines 313, the lug 311 may be dropped into a position adjacent the side face 310, as indicated by the dotted lines 315, to hold the lever 299 in the transverse position shown in dotted lines 313, which will result in the holding of the latch levers 287 in retracted position.

Locking pins 320 are provided at the ends of the side frame member 284, Fig. 15, for engagement with openings 321, Fig. 3, in the paritions 252 of the berth compartments 253, to retain the berth frame 255 in raised position, as shown in dotted lines in the upper left-hand portion of this figure. The locking pins 320 are of hollow form and are slidable in cylindrical fittings 322 which are secured in the ends of the side frame member 284 as shown in Fig. 15. Each pin, as shown in Fig. 16, has a stem 323 projecting rearwardly therefrom, and a spring 324 is placed around this pin to exert a yieldable outward force against the pin 320. The inner end 325 of each stem 323 is connected by a link 326 with a centrally pivoted lever 299b having the same characteristics as the lever 299 previously described. By rotation of the lever 299b from the position in which it is shown in full lines in Figs. 15 and 16 to the dotted line position 327 thereof, the links 326 may be drawn toward each other with the result that the locking pins 320 will be retracted into the supporting fittings 322. The lever 299b is carried on the inner end of the shaft 301b which is rotatable within a fitting 302b which is also secured to the wall 304. The lever 299b has a downwardly projecting locking plug 311b which may be moved upwardly from engagement with side faces 309a and 310a, provided at the upper end of the fitting 320b, by forcing inwardly against the lower end of the shaft 301b so as to raise the lever 299b, which may be accomplished by upward pressure applied to a key which engages the squared body 307b on the lower end of the shaft 301b.

We claim as our invention:

1. In an aircraft chair of the character described, the combination of: a seat member having trunnion means projecting from the sides thereof; a back member cushioned only on one side thereof and supported so as to be rotated on a lateral axis between the ends thereof; a supporting structure having horizontal channels at the sides of said seat member and facing the same, said channels receiving said trunnion means and being of such length and so placed in centralized relation to said supporting structure as to permit longitudinal movement of said trunnion means in said channels for longitudinal adjustment of said seat member in opposite directions from a centralized position relative to said supporting structure; and means for connecting said back member to said supporting structure at the rear edge or the front edge of said seat member.

2. In an aircraft chair of the character described, the combination of: a supporting structure having channels therein; a seat member having hollow trunnions to project into said channels and seat locking means passing within said trunnions; and a back member to cooperate with said seat member.

3. In an aircraft chair of the character described, the combination of: a supporting structure having a pair of spaced members extending forwardly and rearwardly in parallel relation, each of said members having an inwardly faced channel with upwardly directed entrance openings at the ends thereof; a seat member having means projecting into said channels whereby to support said seat member and permit longitudinal movement thereof; links extending from said supporting structure; and a back member pivotally connected to said links, said back member having bodies at the ends thereof adapted for supporting engagement in said entrance openings of said channels.

4. In an aircraft chair of the character described, the combination of: a seat member having two sets of trunnions projecting from the sides thereof; a supporting structure having members disposed along the sides of said seat member with longitudinal channels therein to receive said trunnions, said channels having upwardly projecting pockets into which one set of said trunnions can move upwardly when one end of said seat member is lifted; means for locking said seat member in a position wherein said set of said trunnions is in said pockets of said supporting structure; a back member; and means for supporting said back member in adjustable cooperation with said seat member.

5. In an aircraft chair of the character described, the combination of: a seat member having tubular trunnions projecting from the sides thereof; locking pins slidable in said tubular trunnions; means for extending and retracting said pins from the ends of said trunnions; and a supporting structure having means to receive said trunnions and apertures to receive said locking pins when the same are extended from said trunnions.

6. In an aircraft chair of the character described, the combination of: a seat member having tubular trunnions projecting from the sides thereof; locking pins slidable in said tubular trunnions; means for extending and retracting said pins from the ends of said trunnions; a supporting structure having channels to receive said trunnions in slidable relation; and apertures in the bottoms of said channels into which said locking pins can be projected from the ends of said trunnions.

7. In an aircraft chair of the character described, the combination of: a seat member; a support for said seat member, said support having engageable means at both ends thereof; and a back having means for connecting the same in a position at either end of said seat member, said connecting means including a pair of locking pins at each end of said back, and independent means for each pair of said locking pins to selectively move the same between extended and retracted positions, one of said pair of locking pins being positioned for engagement with said engageable means at one end of said support and the other pair of said locking pins being positioned for engagement with said engageable means and the other end of said support.

8. In an aircraft chair of the character described, the combination of: a seat member; a support for said seat member; a back for cooperation with said seat member; pivot means at the lower end of said back connecting the same to said support; link means pivotally connected to opposite sides of said back, said link means each comprising an inner member and an outer member in telescoped relation; a spring extending transversely in said back; and means connecting the opposite ends of said spring to said outer members to urge the same toward collapsed or retracted relation to said inner members.

9. In an aircraft chair of the character described, the combination of: a seat member; a support for said seat member; a back for cooperation with said seat member; pivot means at the lower end of said back connecting the same to said support; link means pivotally connected to opposite sides of said back, said link means each comprising an inner member and an outer member in telescoped relation; a spring extending transversely in said back; means connecting the opposite ends of said spring to said outer members to urge the same toward collapsed or retracted relation to said inner members; and locking means for each of said links, each of said locking means being operative to prevent longitudinal movement of an inner member of said links relative to the outer member thereof, and being controlled by relative angular movement of the inner member and its cooperating outer member.

10. In passenger accommodations for aircraft, the combination of: a cabin having a wall; a berth frame; link means connecting the wall edge of said berth frame to said wall, said link means having pivot means connecting the same to said berth frame and hinge means connecting it to said wall, said link means being swingable on said hinge means from a raised position to a lowered position, and carrying said wall edge of said berth frame toward said wall as it moves from raised to lowered position; resilient means connected to said link means and urging the same to raised position; means for supporting the aisle edge of said berth frame; and means for locking said link means to said berth frame so that said berth frame and said link means cannot swing out of said lowered position.

11. In passenger accommodations for aircraft, the combination of: a cabin having a wall; a berth frame; link means connecting the wall edge of said berth frame to said wall, said link means having pivot means connecting the same to said berth frame and hinge means connecting it to said wall, said link means being swingable on said hinge means from a raised position to a lowered position, said link means being disposed in hanging relation when said berth frame is in lowered position; means for locking said link means to said berth frame; and foldable struts extending upwardly from the aisle edge of said berth frame to said wall to support said berth frame in lowered position, each of said foldable struts comprising an upper link and a lower link connected by a joint, there being locking means at said joint for holding said links of the foldable strut in extended relation.

12. In passenger accommodations for aircraft, the combination of: a cabin having a wall; a berth frame; link means connecting the wall edge of said berth frame to said wall, said link means having pivot means connecting the same to said berth frame and hinge means connecting it to said wall, said link means being swingable on said hinge means from a raised position to a lowered position, said link means being disposed in hanging relation and in a plane which crosses the plane defined by said berth frame when said berth frame is in lowered position; means for supporting the aisle edge of said berth frame; and releasable means for locking said hinge means to said berth frame when the same is in lowered position.

13. In passenger accommodations for aircraft, the combination of: a cabin having a wall with a shallow compartment in the upper portion thereof; a berth structure receivable in said compartment, said structure comprising a berth frame panel and a link panel lying in side-by-side relation and cooperating to substantially close the opening of said compartment, there being hinge means connecting said panels together and pivot means connecting said link panel to the wall so that said link panel may be swung down from the position wherein it cooperates with said berth frame panel to substantially close said opening to a hanging position; means for supporting said berth frame panel in a substantially horizontal position when said link panel is swung down to said hanging position; and means for locking said link panel to said berth frame panel when said link panel is in said hanging position.

14. In an aircraft chair of the character described, the combination of: a supporting structure having channels therein; a seat member having members projecting into said channels whereby said seat member may be moved along said channels; and locking means carried by said seat member and having engagement with said supporting structure operative to lock said seat member in a plurality of positions along said channels.

15. In passenger accommodations for aircraft, the combination of: a cabin having a wall; a berth frame; link means connecting the wall edge of said berth frame to said wall, said link means having pivot means connecting the same to said berth frame and hinge means connecting it to said wall, said link means being swingable on said hinge means from a raised position to a lowered position, said link means being disposed in hanging relation and in a plane which crosses the plane defined by said berth frame when said berth frame is in lowered position; means for supporting said berth frame at a point spaced from said link means, when said berth frame is in said lowered position; and releasable means engaging said link means to lock the same in said hanging relation thereof.

16. In an aircraft chair of the character described, the combination of: a seat member; a supporting structure comprising a pair of spaced vertical walls disposed on opposite sides of said seat member, said vertical walls having upper and lower vertically spaced walls to form channels which are substantially horizontal; means projecting from the sides of said seat member into said channels and being movable in said channels to enable movement of said seat member relative to said supporting structure; and releasable locking means projecting from said seat member into engagement with at least one of said side walls to prevent movement of said seat member relative to said supporting structure.

17. In an aircraft chair of the character described, the combination of: a seat member; a supporting structure comprising a pair of spaced vertical walls disposed on opposite sides of said seat member, said vertical walls having upper and lower vertically spaced walls to form channels which are substantially horizontal; said walls having recesses therein for receiving locking pins; means projecting from the sides of said seat member into said channels and being movable in said channels to enable movement of said seat member relative to said supporting structure; and releasable locking pins projectible from said seat member into said recesses.

18. In an aircraft chair of the character described, the combination of: a seat member; a supporting structure comprising a pair of spaced vertical walls disposed on opposite sides of said seat member, said vertical walls having upper and lower vertically spaced walls to form channels which are substantially horizontal, said walls having recesses therein for receiving locking pins; means projecting from the sides of said seat member into said channels and being movable in said channels to enable movement of said seat member relative to said supporting structure; releasable locking pins projectible from said seat member into said recesses; and lever actuated means carried by said seat member, operative to retract said locking pins from engagement with said recesses.

EDWARD F. BURTON.
JOHN C. BUCKWALTER.